United States Patent [19]
Honda et al.

[11] Patent Number: 5,961,893
[45] Date of Patent: Oct. 5, 1999

[54] PLASMA DISPLAY FRONT PANEL

[75] Inventors: Satoshi Honda, Ehime; Kayoko Ueda; Yukio Yasunori, both of Osaka, all of Japan

[73] Assignee: Sumitomo Chemical Company, Limited, Osaka, Japan

[21] Appl. No.: 08/955,489

[22] Filed: Oct. 22, 1997

[30] Foreign Application Priority Data

Oct. 23, 1996 [JP] Japan .................................. 8-280872
Nov. 26, 1996 [JP] Japan .................................. 8-314646

[51] Int. Cl.$^6$ .............................. F21V 9/04; H01J 31/00; H01J 1/62; G02B 5/22
[52] U.S. Cl. ...................... 252/587; 252/582; 359/885; 313/479; 313/489
[58] Field of Search ..................... 252/582, 587; 359/885; 315/111.21; 313/489, 479

[56] References Cited

U.S. PATENT DOCUMENTS

| | | | |
|---|---|---|---|
| 4,042,849 | 8/1977 | Wachtel ................................... | 313/489 |
| 4,296,214 | 10/1981 | Kamada et al. . | |
| 5,051,650 | 9/1991 | Taya et al. ............................... | 313/489 |
| 5,466,755 | 11/1995 | Sakagami et al. ....................... | 359/885 |
| 5,611,965 | 3/1997 | Shouji et al. ........................... | 252/582 |
| 5,753,999 | 5/1998 | Roozekrans et al. ................... | 313/489 |
| 5,759,448 | 6/1998 | Katano et al. .......................... | 252/582 |
| 5,804,102 | 9/1998 | Oi et al. ................................. | 252/587 |

FOREIGN PATENT DOCUMENTS

| | | |
|---|---|---|
| 0575882A2 | 6/1993 | European Pat. Off. . |
| 0586135A2 | 8/1993 | European Pat. Off. . |
| 0782164A1 | 12/1996 | European Pat. Off. . |
| 7-84123 | 3/1995 | Japan . |

*Primary Examiner*—Philip Tucker
*Attorney, Agent, or Firm*—Pillsbury Madison & Sutro LLP

[57] ABSTRACT

The present invention provides a plasma display front panel comprising a transparent substrate which is produced by molding a resinous composition containing the following components (a) to (c), and has a 50% or more transmittance of light with a wavelength in the range of 450 nm to 650 nm, and a 30% or less transmittance of light with a wavelength in the range of 800 nm to 1000 nm;

(a) a monomer having an unsaturated double bond and/or polymer thereof;
(b) a phosphorus atom-containing compound; and
(c) a copper atom-containing compound.

The attachment of this to the front of a plasma display can prevent the effect of near-infrared rays arising from the display on the peripheral devices.

19 Claims, No Drawings

PLASMA DISPLAY FRONT PANEL

BACKGROUND OF THE INVENTION

1. Field of the Invention

The present invention relates to a translucent front panel having near-infrared rays absorbing ability, and further electromagnetic shielding performance to be mounted at the front of a plasma display.

2. Description of Related Art

As a front panel for displays, various front panels with reflection reducing property, abrasion resistance, and stain proofing property have been proposed in order to prevent the indistinctness of the image due to the reflection of illumination light and the reflection of a background, protect the display surface, and proof the stain of the display surface.

A plasma display emits not only visible rays but also rays of light in so-called the near-infrared region of 800 to 1100 nm.

On the other hand, as disclosed in Japanese Non-examined Patent Publication No. 2-309508, the light in the near-infrared region around 950 nm has been used for a remote-control system such as a household fluorescent lamp, TV, and VTR. Further, the light in the same region has been used for data communications between computers.

On the periphery of a plasma display, there has tended to occur trouble in the remote-control system and data communications in these devices, which is supposed to be caused by the light in the near-infrared region emitted from the plasma display.

A plasma display emits not only light in the near-infrared region but also electromagnetic wave, and hence a problem of malfunctions of peripheral devices due to the electromagnetic wave has been pointed out.

In Japanese Non-examined Patent Publication No. 6-118228, there is disclosed an optical filter suitable for photometric filters and color correction filters of cameras which contains a copolymer and a metallic salt. This copolymer is obtained by copolymerizing a monomer mixture which comprises a monomer containing a phosphoric acid group of a specific structure and a monomer copolymerizable with this monomer, and the metallic salt contains copper salts such as copper benzoate and copper acetate as a main component.

However, with conventional display front panels proposed in the prior art, which have reflection reducing property, abrasion resistance, and stain proofing property, the trouble to remote-control system and data communications, and further the effect on the peripheral devices due to electromagnetic wave cannot be prevented.

In Japanese Non-examined Patent Publication No. 6-118228, there is no description of a plasma display front panel.

From a detailed study of a front panel for a plasma display which is excellent in near-infrared rays absorbing ability and further electromagnetic shielding performance, the inventors of this invention have reached the present invention by founding as follows: the transparent substrate is suitable for a plasma display front panel which is produced by molding a resinous composition containing (a) a monomer having an unsaturated double bond and/or polymer thereof, (b) a phosphorus atom-containing compound, and (c) a copper atom-containing compound, and has a 50% or more average transmittance of light with a wavelength in the range of 450 nm to 650 nm, and a 30% or less average transmittance of light with a wavelength in the range of 800 nm to 1000 nm. Further, the one obtained by providing this transparent substrate with an electromagnetic shielding layer is suitable for a plasma display front panel. These substrates can protect the front of a plasma display, and exhibit excellent near-infrared rays absorbing ability and electromagnetic shielding performance.

SUMMARY OF THE INVENTION

An object of the present invention is to provide a plasma display front panel having excellent near-infrared rays absorbing ability.

Another object of the present invention is to provide a plasma display front panel having excellent near-infrared rays absorbing ability and electromagnetic shielding performance.

Another object of the present invention is to provide a plasma display front panel having excellent near-infrared rays absorbing ability and/or electromagnetic shielding performance and/or abrasion resistance and/or reflection reducing property and/or stain proofing property.

The present invention is as follows;

(1) A plasma display front panel comprising a transparent substrate which is obtained by molding a resinous composition containing the following components (a) to (c), and has a 50% or more average transmittance of light with a wavelength in the range of 450 nm to 650 nm, and a 30% or less average transmittance of light with a wavelength in the range of 800 nm to 1000 nm:

(a) a monomer having an unsaturated double bond and/or polymer thereof;

(b) a phosphorus atom-containing compound; and (c) a copper atom-containing compound;

(2) A plasma display front panel produced by laminating an electromagnetic shielding layer on the transparent substrate described in the above (1).

(3) A plasma display front panel produced by further laminating a hard coat layer and/or a reflection preventing layer and/or a stain proofing layer on the surface of the panel described in the above (1) or (2).

DETAILED DESCRIPTION OF THE INVENTION

The front panel of the present invention is to be mounted at the front of a plasma display, and is in film or sheet form.

Any size of the front panel can be selected in accordance with the screen size of a plasma display. Any thickness can be also selected, but it is approximately in the range of 1 to 10 mm.

A transparent substrate can be formed with transparent resinous composition having near-infrared rays absorbing ability, and takes the shape of film or sheet.

Examples of the transparent resinous composition include acrylic resin, polycarbonate resin, polyester resin, cellulose resin such as triacetylcellulose, diacetylcellulose, and styrene resin. Among them, acrylic resin is suitable in terms of the light transmittance, weather resistance and the like.

As a transparent substrate, the transparent substrate itself may be made from a resinous composition having near-infrared rays absorbing ability, or it may be the one obtained by forming a layer made of a resinous composition with near-infrared rays absorbing ability on a transparent plastic film, plastic sheet or plate glass(hereinafter referred to as transparent sheet) with no near-infrared rays absorbing ability.

Examples of a resinous composition having near-infrared rays absorbing ability include the ones shown as follows:
(1) resinous compositions containing a methyl methacrylate polymer, a compound including a phosphorus atom and a compound including a copper atom as disclosed in Japanese Patent Publication No. 62-5190;
(2) resinous compositions containing a copper compound and thiourea derivatives as disclosed in Japanese Non-examined Patent publication No. 6-73197; and
(3) resinous compositions containing a tungsten compound as disclosed in U.S. Pat. No. 3,647,729.

The resinous compositions containing resins produced by polymerizing monomers having unsaturated double bonds such as methyl methacrylate, a compound containing a phosphorus atom, and a compound containing a copper atom are excellent in transmittance of light in the visible range, and strength and durability when formed into a front panel, and hence they are preferable.

The monomers having unsaturated double bonds are not specifically limited only if they are monofunctional or multifunctional monomers having at least one radical polymerizable unsaturated double bond per molecule.

Examples of the monofunctional monomer include (meth)acrylic esters having straight-chain or branched chain alkyl groups such as methyl (meth)acrylate, ethyl (meth)acrylate, propyl (meth)acrylate, n-butyl (meth)acrylate, isobutyl (meth)acrylate, t-butyl (meth)acrylate, 2-ethylhexyl (meth)acrylate, isodecyl (meth)acrylate, n-lauryl (meth)acrylate, and n-stearyl (meth)acrylate; (meth)acrylic esters having alicyclic hydrocarbon radicals such as bornyl (meth)acrylate, fenchyl (meth)acrylate, l-menthyl (meth)acrylate, adamantyl (meth)acrylate, dimethyladamantyl (meth)acrylate, cyclohexyl (meth)acrylate, isobornyl (meth)acrylate, tricyclo[5. 2. 1. $0^{2,6}$]deca-8-yl (meth)acrylate, and dicyclopentenyl (meth)acrylate; (meth)acrylic esters having an alkenyl group, aralkyl group, and aryl group such as allyl (meth)acrylate, benzyl (meth)acrylate and naphthyl (meth)acrylate; styrene monomers such as styrene, α-methylstyrene, vinyltoluene, chlorstyrene, and bromstyrene; unsaturated carboxylic acids such as (meth)acrylic acid, maleic acid, and itaconic acid; acid anhydride such as maleic anhydride and itaconic anhydride; monomers having hydroxyl groups such as 2-hydroxyethyl (meth)acrylate, 2-hydroxypropyl (meth)acrylate, tetrahydrofurfuryl (meth)acrylate, and monoglycerol (meth)acrylate; monomers having nitrogen such as acrylamide, methacrylamide, acrylonitrile, methacrylonitrile, diacetone acrylamide, and dimethylaminoethyl methacrylate; monomers having epoxy groups such as allyl glycidyl ether, and glycidyl (meth)acrylate; monomers having alkylene oxide groups such as poly(ethylene glycol) mono(meth)acrylate, polypropylene glycol mono(meth)acrylate, and poly(ethylene glycol) monoallyl ether; and other monomers such as vinyl acetate, vinyl chloride, vinylidene chloride, vinylidene fluoride, and ethylene.

Examples of multifunctional monomers include alkyldiol di(meth)acrylates such as ethylene glycol di(meth)acrylate, 1,4-butanediol di(meth)acrylate and neopentyl glycol di(meth)acrylate; alkylene glycol di(meth)acrylates such as tetraethylene glycol di(meth)acrylate, and tetrapropylene glycol diacrylate; aromatic multifunctional compounds such as divinylbenzene and diallyl phthalate; and polyhydric alcohol (meth)acrylic esters such as pentaerythritol tetra (meth)acrylate and trimethylal propane tri(meth)acrylate.

The above-described term "(meth)acrylate" refers to acrylate or methacrylate.

Among the above-described monomers, (meth)acrylic esters are preferable in terms of the availability and transparency of the resulting resin.

The above-described monofunctional monomer and/or multifunctional monomer can be used in combination of two or more kinds thereof.

In order to obtain balanced moisture resistance and strength of a transparent substrate, the (meth)acrylate monomers and/or the resins produced by polymerization thereof are preferable as the component (a), the (meth)acrylate monomers which contain (meth)acrylate monomers represented by the following general formula (1);

$$CH_2=(X)COOR^1 \qquad (1)$$

(wherein X represents a hydrogen atom or a methyl group, and $R^1$ represents a hydrocarbon radical with 3 to 18 carbon atoms), and multifunctional monomers having 2 or more unsaturated double bonds per molecule, and the total amount thereof is 50% by weight or more. The total amount maybe 100% by weight, but ordinarily a monofunctional monomer having one radical polymerizable unsaturated double bond per molecule is used in an amount of 5 to 45% by weight in view of cost efficiency and the like.

Examples of these (meth)acrylate monomers and multifunctional monomers are given from the above-described ones.

Among them, (meth)acrylate monomers having alycyclic hydrocarbon radicals, especially, cyclohexyl (meth)acrylate, isobornyl (meth)acrylate, tricyclo[5. 2. 1. 0 $^{2,6}$]deca-8-yl= (meth)acrylate, and dicyclopentenyl (meth)acrylate are good in heat resistance and moisture resistance of resinous compositions, and hence Dreferably used.

The proportion of multifunctional monomers to (meth)acrylate monomers and/or (meth)acrylate monomers in polymers thereof is in the range of 0.1 to 10 parts by weight per 1 part by weight of (meth)acrylate monomers.

When the proportion is less than 0.1 parts by weight, sufficient strength cannot be obtained, whereas when more than 10 parts by weight, the resin becomes brittle, leading to undesirable result.

The resins of the component (a) can be readily obtained by known polymerization processes such as block polymerization, suspension polymerization, and emulsion polymerization.

The resins may contain various additives in such a range as not to deteriorate the performance.

The compounds containing phosphorus atoms are the compounds as shown by the following general formula (2)

$$(R^2O)_{3-n}-P(O)-(OH)_n \qquad (2)$$

(wherein $R^2$ represents alkyl group, aryl group, aralkyl group, and alkenyl group with 1 to 18 carbon atoms, or $R^2O$ represents polyoxyalkyl group, and (meth)acryloyl oxyalkyl group, and (meth)acryloyl polyoxyalkyl group with 4 to 100 carbon atoms, and n represents 1 or 2).

Examples of the compound containing phosphorus atoms include alkyl phosphates such as monoethyl phosphate, diethyl phosphate, monobutyl phosphate, dibutyl phosphate, monohexyl phosphate, dihexyl phosphate, monoheptyl phosphate, diheptyl phosphate, monooctyl phosphate, dioctyl phosphate, monolauryl phosphate, dilauryl phosphate, monostearyl phosphate, distearyl phosphate, mono-2-ethylhexyl phosphate, and di-2-ethylhexyl phosphate; aryl phosphates such as monophenyl phosphate, and diphenyl phosphate; aralkyl phosphates such as mono(nonylphenyl) phosphate, and bis(nonylphenyl) phosphate; alkenyl phosphates such as monoallyl phosphate and diallyl phosphate; polyoxyalkyl phosphates such as poly(ethylene glycol) phosphate; (meth)acryloyl oxyalkyl phosphates such as (meth)acryloyl oxyethyl phosphate, bis[(meth)acryloyl oxyethyl] phosphate, (meth)acryloyl oxypropyl phosphate, and bis[(meth)acryloyl oxypropyl] phosphate; and (meth)acryloyl polyoxyalkyl phosphates such as (meth)acryloyl polyoxyethyl phosphate, and (meth)acryloyl polyoxypropyl phosphate.

The above-described compounds containing phosphorus atoms can be used in combination of two or more kinds thereof.

The amount of the compound containing phosphorus atoms to be used is in the range of 0.1 to 50% by weight, and preferably in the range of 0.5 to 30% by weight based on the total amount of the monomers having unsaturated double bonds and/or polymer thereof of the component (a) and the compounds containing phosphorus atoms. If the amount of the compounds containing phosphorus atoms to be used is less than 0.1% by weight, good near-infrared rays absorbing ability cannot be obtained. On the other hand, if more than 50% by weight, the strength of the substrate composed of resulting resinous composition deteriorates, leading to undesirable result.

Among the above-described compounds containing phosphorus atoms, compounds having radical polymerizable unsaturated double bonds in the molecule, and having phosphorus atoms in the molecule can form copolymers with the monomers having unsaturated double bonds of the component (a), and hence these compounds are preferable.

When the compounds containing phosphorus atoms have unsaturated double bonds in molecule (hereinafter referred to as phosphorus atom-containing monomers), the processes of copolymerization with monomers having unsaturated double bonds are conducted by known polymerization processes such as block polymerization, suspension polymerization, and emulsion polymerization.

Among the monomers having unsaturated double bonds in molecule, compounds of the general formula (2) wherein $R^2O$ is represented by the following general formula (3)

$$CH_2=C(X)COO(Y)_m— \qquad (3)$$

(wherein X represents a hydrogen atom or methyl group, Y represents an oxyalkylene group with 2 to 4 carbon atoms, and when Y is an oxyalkylene group with 2 carbon atoms, m denotes a number average of 8 to 20, when Y is an oxyalkylene group with 3 carbon atoms, m denotes a number average of 5 to 20, and when Y is an oxyalkylene group with 4 carbon atoms, m denotes a number average of 4 to 20), results in a substrate having high strength and excellent durability, and hence is more preferable.

In case of using the compound of general formula (3) as the Phosphorus atom-containing compound, results in a substrate having high strength without use of compound of general formula (1) and multifunctional monomer.

As the oxyalkylene group of Y in the general formula (3), a oxypropylene group with 3 carbon atoms results in a front panel having lowered hygroscopic property, and hence is preferable.

The total number of carbon atoms in the group shown by the general formula (3) is more preferably 19 or more at a number average. When the total number of carbon atoms is 18 or less, the strength of the resulting front panel deteriorates, and the hygroscopic property increases.

Phosphorus atom-containing compound is preferably used in which Y is a oxypropylene group with 3 carbon atoms, and m is 5 to 20.

For the compounds containing copper atoms in the present invention, there is no specific limitation except that the compounds must contain copper atoms, and various kinds thereof can be used.

For example, salts of carboxylic acid and copper ion such as copper acetate, copper formate, copper propionate, copper valerate, copper hexanoate, copper octylate, copper decanoate, copper laurate, copper stearate, 2-copper ethylhexanoate, copper naphthenate, copper benzoate, and copper citrate, complex salts of acetylacetone or acetoacetic acid and copper ion, copper hydroxide, and the like can be used.

In order to improve the moisture resistant property of the resulting transparent substrate, the use of copper hydroxide is preferable.

The amount of the compound containing copper atoms of the component (c) to be used in the present invention is about 0.01 to 30 parts by weight, and preferably 0.1 to 20 parts by weight for every 100 parts by weight of the monomer and/or polymer thereof of the component (a). When the amount is less than about 0.01 parts by weight, good near-infrared rays absorbing ability cannot be obtained. On the other hand, when the amount is more than about 30 parts by weight, the transmittance of light in the visible range of the resulting transparent substrate deteriorates, leading to undesired result.

On the basis of these amounts, 1 mole of copper atom-containing compound corresponds to approximately 0.05 to 10 moles of phosphorus atom-containing compound.

The resinous composition of the present invention is prepared by homogeneously mixing the components (a), (b), and (c) mentioned above.

The processes of homogenous mixing includes the following processes:

(1) A process of uniformly mixing ① mixture of the monomer mixture of the component (a) and phosphorus atom-containing compound of the compound(b), or ② a mixture of the mixture (syrup) of monomer mixtures and (meth)acrylate resin and phosphorus atom-containing compound, with copper atom-containing compound, followed by block polymerization, for example, polymerization and curing of the mixture in a cell or mould, making the mixture to take the desired form.

The polymerization in this process can be conducted by known steps such as a step in which polymerization is conducted in the presence of known radical polymerization initiator, or in the presence of so-called redox type initiators consisting of radical polymerization initiator and accelerator, and a step of irradiation with ultraviolet rays or radioactive rays;

(2) a process of uniformly mixing polymers of the component (a) in powder form obtained by known polymerization processes such as block polymerization, suspension polymerization, and emulsion polymerization with a phosphorus atom-containing compound of the component (b) and a copper atom-containing compound of the component (c) by known melting and kneading process; and (3) a process of uniformly mixing the copolymers of monomer mixtures of the component (a) and (meth)acryloyl oxyethyl phosphate, or the like of the component (b) with copper atom-containing compounds of the component (c) by known melting and kneading process.

The processes for obtaining a transparent substrate from the above-described resinous compositions include the following processes;

(1) a process of making the above-described resinous compositions to take the form of plate by extrusion molding method; and (2) a process of cast polymerizing the above-described resinous compositions.

The processes of forming a layer made of resinous composition containing the components (a) (b) and (c) onto the transparent sheet with no near-infrared rays absorbing ability include the following processes:

(1) a process of forming a resinous composition layer by coating the transparent sheet surface with resinous composition;
(2) a process of joining a film made of resinous composition together with the transparent sheet surface; and
(3) a process of laminating a transparent sheet and resinous composition.

A transparent substrate can be used in a monolayer, or a laminate of a plurality of resin films or sheets.

A transparent substrate may be used to which light diffusion agent, colorant, rubber surface lubricant, stabilizer, ultraviolet absorbing agent, antioxidant, antistatic agent, flame retarder, and the like are added if desired.

The transparent substrate constituting the plasma display front panel of the present invention protects the front of a plasma display, and has a 50% or more, and preferably 60% or more average transmittance of light with a wavelength in the range of 450 nm to 650 nm, and a 30% or less, and preferably 20% or less average transmittance of light with a wavelength in the range of 800 to 1000 nm. This will not making it difficult to see the image, and can absorb the near-infrared rays.

If the average transmittance of light with a wavelength in the range of 450 to 650 nm is 50% or less, it becomes difficult to see the image of a plasma display. On the other hand, if the average transmittance of light with a wavelength in the range of 800 nm to 1000 nm is 30% or more, the near-infrared rays from a plasma display cannot be absorbed, adversely affecting the peripheral remote-control devices and the like.

As a plasma display front panel of the present invention, an electromagnetic shielding layer can be formed on the above-described transparent substrate having near-infrared rays absorbing ability to impart electromagnetic shielding performance to the resulting front panel.

The conductivity of the electromagnetic shielding layer may be set corresponding to the amount of electromagnetic wave emitted from the front of a plasma display. In order to obtain sufficient electromagnetic shielding performance, the surface resistivity is preferably 100 Ω/□ or less, and more preferably 20 Ω/□ or less. If the surface resistivity is more than 100 Ω/□, in some cases, sufficient electromagnetic shielding performance cannot be obtained.

It is desirable to use a transparent plastic film, plastic sheet or plate glass having conductivity as an electromagnetic shielding layer in view of not impairing the brightness of the screen.

For the electromagnetic shielding layer, there is no specific limitation except that it must have a surface resistivity satisfying the above-described conditions, and be optically transparent. However, the one produced by forming a conductive thin film onto the transparent plastic film surface is preferable in view of handling thereof.

Examples of plastic film include polycarbonate, polyester, polyethylene terephthalate, and triacetyl cellulose.

As the process for forming a conductive thin film on the transparent plastic film surface, various kinds of known processes can be adopted such as a process of laminating conductive metallic oxides including platinum, gold, silver, copper, and palladium onto the transparent plastic film surface by techniques such as plating, evaporation, and sputtering; a process of coating the transparent plastic film surface with conductive coating material; and a process of forming a layer made of conductive polymers on the transparent plastic film surface.

Vacuum evaporation and sputtering techniques are preferable in view of film-forming property and film property. Thin films so constructed that metal layers and high refractive index dielectric layers such as metallic oxide, metallic sulfide, and metallic nitride, are alternately laminated, and a thin films so constructed that conductive metallic oxides are contained are preferable in view of conductivity and optical characteristics.

The one obtained by sandwiching mesh made of conductive fiber between 2 transparent sheet, and the one obtained by filling resins of a transparent sheet with conductive resinous agent such as metallic powder and metallic fiber can be used.

For the process of forming an electromagnetic shielding layer on the transparent substrate having near-infrared rays absorbing ability, there is no specific limitation, and known processes are used, and a process of joining them together by means of an adhesive is commonly used.

An electromagnetic shielding layer can be directly formed onto the transparent substrate having near-infrared rays absorbing ability by techniques such as evaporation, sputtering, and coating.

To the plasma front panel of the present invention, a hard coat layer, reflection preventing layer, stain proofing layer and the like can be further formed onto the surface, improving the performance thereof.

The hard coat layer can be given directly onto the surface of the transparent substrate, or onto the surface of the electromagnetic shielding layer.

As the hard coat layer, the known one for use in this application may be used.

Examples include hardened films obtained by polymerizing and curing multifunctional monomers as main components.

Examples include the layer obtained by polymerizing and curing multifunctional polymeric compounds containing 2 or more (meth)acryloyl groups such as urethane (meth)acrylate, polyester (meth)acrylate, and polyether (meth)acrylate with activation energy beams such as ultraviolet rays and electron beam; and the layer obtained by crosslinking and curing silicon, melamine, and epoxy type crosslinking resin materials by the application of heat.

Among them, the layer produced by curing urethane acrylate resin materials with ultraviolet rays or electron beam, and the layer produced by curing silicon type resin materials by the application of heat are excellent in view of durability and handling thereof.

In order to form unevenness in the surface to lessen the gloss of the surface of the hard coat layer, inorganic compound particles may be added to a solution of the hard coat materials.

Examples of the inorganic compounds to be used include inorganic oxides such as silicon dioxide, aluminum oxide, magnesium oxide, tin oxide, silicon monoxide, zirconium oxide, and titanium oxide.

The process of forming a hard coat layer is as follows; first, according to the processes used in ordinary coating steps including spin coating, dip coating, roll coating, gravure coating, curtain flow coating, and bar coating, a transparent substrate is coated with materials, followed by curing by the methods corresponding to the used materials.

In this process, the solution of hard coat materials may be diluted with various kinds of solvents in order to enable the coat to intimately adhere to a substrate with ease, or in order to adjust the film thickness of the coat.

The thickness of the hard coat layer is not specifically limited, and preferably in the range of 1 to 30 μm. If the thickness is less than 1 μm, there appears interference patterns of light, resulting inundesired appearance. On the other hand, if the thickness is more than 30 μm, there occurs cracking in the coat, resulting in undesired strength of the coat.

The reflection preventing layer can be given directly on the surface of the transparent substrate, or can be given on the surface of the electromagnetic shielding layer or hard coat layer.

The reflection preventing layer is not specifically limited, and includes known layer such as the one made of monolayer or multilayer thin films of inorganic oxides, and inorganic halides, and formed with known processes such as vacuum evaporation, ion plating, and spattering disclosed in Japanese Non-examined Patent Publication Nos. 4-338901, 64-86101 and 56-113101; or a thin film made of a fluorine-containing polymer disclosed in Japanese Non-examined Patent Publication No.7-151904.

The stain proofing layer can be given directly on the surface of the transparent substrate, or on the surface of the electromagnetic shielding layer, hard coat layer, or reflection preventing layer.

The stain proofing layer is not specifically limited, and includes known layer such as a stain proofing layer made of fluorine-, and siloxane-containing compounds disclosed in Japanese Non-examined Patent Publication Nos. 3-266801 and 6-256756, and Japanese Patent Publication No. 6-29332.

The electromagnetic shielding layer, hard coat layer, reflection preventing layer, or stain proofing layer are set corresponding to the desired performances, and may be formed directly on the surface of the transparent substrate having near-infrared rays absorbing ability, or a sheet or film in which these layers are formed may be laminated or joined together on the transparent substrate surface.

These layers are also formed on the both faces or one face of the transparent substrate if required, and the order of the formation thereof is appropriately selected in accordance with the magnitude of the performances to be given, and the like.

As a plasma display front panel, the transparent substrate having near-infrared rays absorbing ability, or the transparent substrate in which the electromagnetic shielding layer and the like are formed can be used as it is as described above. In normal times, the outer frame is further employed at the perimeter with a fixture to a display, earth cable, and the like being attached thereto.

The plasma display front panel of the present invention can prevent the interference due to the near-infrared rays from a plasma display from arising in remote-control systems and data communications in the peripheral devices of the plasma display. The formation of an electromagnetic shielding layer can further prevent the effect of electromagnetic wave on the peripheral devices. The reflection preventing performance, abrasion resistance, and stain proofing performance can be imparted to the plasma display front panel, providing a plasma display front panel having more excellent performances.

EXAMPLES

The present invention will be further illustrated with reference to the following examples.

The evaluations were conducted according to the following methods.
(1) Light Transmittance:
The spectral transmittance in the range of 400 to 1000 nm of the obtained samples were measured by means of a self-registering spectrophotometer U3410 manufactured by Hitachi, Ltd.

(2) Visibility:
The obtained front panel was attached to the front of a plasma display, and the images were seen through the front panel. Then, the difference in color and contour of the images from the images when the front panel was not attached was confirmed.
(3) Flexural Strength:
The flexural strength was measured according to JIS K 6718.
(4) Moisture Resistance Test
Transparent substrate was reduced into piece of 50×50 mm. The piece was placed into water at 80° C. for 5hours. Difference of haze of the piece before and after moisture test was measured on accordance with JIS K7203.
(5) Remote-control Test:
A plasma display PDS1000 manufactured by Fujitsu General Ltd., to which a front panel was attached was placed at a tilted angle of 15° to the plane perpendicular to the TV, ahead of, and at a distance of 10 m from a household TV, and the images were displayed. Remote-control signals (signal wavelength 950 nm) were sent to the household TV from a position at an angle of 15° tilted in the direction opposite to the plasma display, ahead of, and at a distance of 3 m from the household TV to check if the TV would respond normally. Then, the plasma display was brought close to the household TV to measure the distance at which normal response disappeared. When the near-infrared rays produced from the display are not shielded, interference occurs in remote-control, leading to no response, or malfunctions. The shorter the distance at which the normal response disappears is, the more excellent the remote-control interference preventing function is.
(6) Electromagnetic Shielding Performance:
Measurement was conducted by means of a plastic shield material evaluation apparatus TR17301A manufactured by Advantest. corporation, the shielding performance of each frequency is represented by the following formula (4).

[Electromagnetic shielding performance(dB)]=20×Log$_{10}$(X$_0$/X) (4)

(wherein X$_0$ denotes the electromagnetic intensity when no sample is put therein, while X denotes the electromagnetic intensity when samples are put therein.)

When there is no, electromagnetic shielding performance, the value is 0 dB, and the better the shielding performance becomes, the larger the value is.

Example 1

Five parts by weight of copper benzoate anhydride as a copper atom-containing compound and 0.5 part by weight of t-butyl peroxy-2-ethyl hexanoate as a radical polymerization initiator were dissolved in 100 parts by weight of monomer mixture consisting of 78% by weight of methyl methacrylate 4% of methacrylic acid , and 8% by weight of phosphorus atom-containing monomer represented by the following formula (5), and 10% by weight of phosphorus atom-containing monomer represented by the following formula (6).

The resulting solution was injected into a cell for polymerization consisting of a gasket made of polyvinyl chloride and 2 sheet glasses with dimensions of 220×220 mm and a thickness of 10 mm. Then, the solution was heated and polymerized at a temperature of 60° C. for 10 hours, and at a temperature of 100° C. for 2 hours to obtain a transparent substrate with dimensions of 200×200 mm and a thickness of 3 mm.

Thus obtained substrate was used as a front panel for a plasma display as it was. The visibility was good. Tables 1 to 4 show other evaluation results.

$$CH_2=C(CH_3)COO[CH_2CH(CH_3)O]_{5.5}-P(O)-(OH)_2 \quad (5)$$

$$\{CH_2=C(CH_3)COO[CH_2CH(CH_3)O]_{5.5}\}_2-P(O)-OH \quad (6)$$

Example 2

1.75 parts by weight of copper hydroxide as a copper atom-containing compound and 0.3 parts by weight of t-butyl peroxy-2-ethyl hexanoate as a radical polymerization initiator were added to 100 parts by weight of mixture consisting of 45% by weight of methyl methacrylate, 15% by weight of tricyclo[5. 2. 1. 0$^{2.6}$]deca-8-yl (meth)acrylate, and 15% by weight of polyethylene glycol (average molecular weight 200) dimethacrylate, and 15% by weight of polyethylene glycol (average molecular weight 400) dimethacrylate, and 6 parts by weight of phosphorus atom-containing compound represented by the following formula (7), and 6 parts by weight of phosphorus atom-containing compound represented by the following formula (8).

The resulting solution was injected into a cell for polymerization consisting of a gasket with a thickness of 3 mm made of polyvinyl chloride and 2 sheet glasses with dimensions of 620×420 mm and a thickness of 10 mm. Then, the solution was heated and polymerized at a temperature of 50° C. for 1 hours, and at a temperature of 45° C. for 12 hours, and at a temperature of 65° C. for 2 hours, and at a temperature of 100° C. for 2 hours to obtain a transparent substrate with dimensions of 600×400 mm and a thickness of 3 mm, and with near-infrared absorbing ability.

Thus obtained substrate was used as a front panel of a plasma display as it was. The visibility was good. Tables 1 to 4 show other evaluation results.

$$CH_2=C(CH_3)COO-CH_2CH_2O-P(O)-(OH)_2 \quad (7)$$

$$[CH_2=C(CH_3)COO-CH_2CH_2O]_2-P(O)-OH \quad (8)$$

Example 3

A transparent substrate having near-infrared absorbing ability was obtained in the same manner as in example 1 except that 1.2 parts by weight of copper hydroxide as a copper atom-containing compound in place of 5 parts by weight of copper benzoate anhydride.

Thus obtained transparent substrate was used as a front panel of a plasma display as it was. The visibility was good. Tables 1 to 4 show other evaluation results.

Example 4

1.75 parts by weight of copper hydroxide as a copper atom-containing compound, and 0.3 parts by weight of t-butyl peroxy-2-ethyl hexanoate as a radical polymerization initiator were added to 100 parts by weight of mixture consisting of 88% by weight of methyl methacrylate, and 6 parts by weight of phosphorus atom-containing compound represented by the following formula (9), and 6 parts by weight of phosphorus atom-containing compound represented by the following formula (10).

Thus obtained transparent substrate was used as a front panel of aplasma display as it was. The visibility was good. Tables 1 to 4 show other evaluation results.

$$CH_2=C(CH_3)COOCH_2CH(CH_3)O-P(O)(OH_2)- \quad (9)$$

$$[CH_2=C(CH_3)COOCH_2CH(CH_3)O]_2-P(O)-OH- \quad (10)$$

Example 5
[Production of an Acrylic Film with a Reflection Preventing Layer to Which a Stain Proofing Layer is Imparted]

An impact-resistant acrylic film with dimensions of 600× 400 mm and a thickness of 0.25 mm which is mounted with a mask film on one face (TECHNOLOY manufactured by Sumitomo Chemical Co. Ltd.) was impregnated into an urethane acrylate hard coat agent (UNIDIC 17-806: manufactured by Dainippon Ink & Chemicals, Inc., a solid content of 30% in toluene), after which the film was drawn up at a rate of 45 cm/minute to effect coating. The solvent was volatilized, and then the mask film was removed, followed by irradiation of a 120 W metal halide lamp (UB0451 manufactured by IGRAPHYICS, Co.,) from a distance of 20 cm for 10 seconds. This results in the formation of a hard coat layer onto the acrylic film. The face on which no hard coat layer was formed was mounted with a mask film again.

This acrylic film with a hard coat layer given was put in a vacuum evaporation bath of a vacuum evaporator, and the degree of vacuum was set at 2×10$^{-5}$ Torr. Then, evaporation was effected by means of an electron beam in the order of silicon dioxide, titanium dioxide, silicon dioxide, titanium dioxide, and silicon dioxide so as to make the thickness of each layer 15, 15, 30, 110, and 90 nm, respectively to give a reflection preventing layer.

Then, into 0.1% by weight of solution prepared by diluting a fluorine-containing silane compound (manufactured by Daikin Industries Ltd., a number average molecular weight of about 5000, and an average degree of polymerization of vinyl trichlorosilane unit 2) represented by the following formula (10):

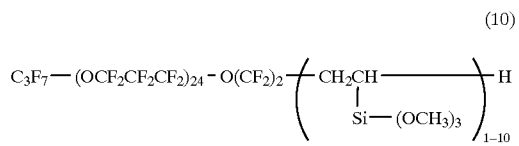

(10)

with tetradecaf luorohexane, the aforementioned acrylic film with a hard coat layer and reflection preventing layer was impregnated. Then, the film was drawn up at a rate of 15 cm/minute to effect coating. After coating, the film was allowed to stand for a day so that the solvent was volatilized, thus forming a stain proofing on the surface of the reflection preventing layer.

[Production of a Front Panel]

This acrylic film, from which the mask film was removed, was joined together on both faces of the transparent substrate obtained in the same manner as in example 1 by the use of acrylic adhesive. This results in a front panel having a hard coat layer, reflection preventing layer, and stain proofing layer.

Compared with the front panel of example 1, there is less reflection of a background, exhibiting good visibility. Table 4 shows the results of remote-control tests.

Example 6
[Production of a Glare Shielding Acrylic Film to Which a Stain Proofing Layer is Imparted]

To an urethane acrylate hard coat agent diluted with toluene so that a solid content becomes 30% (UNIDIC 17-806: manufactured by Dainippon Ink & chemicals, Inc.) was added 6 parts by weight of silica fine particles (SAILOID 244: manufactured by Fuji Devison Chemical Co.,) per 100 parts by weight of hard coat solid components. Then, the mixture was stirred by means of a stirer for 5 minutes to be dispersed.

Into the dispersion solution, an impact-resistant acrylic film with dimensions of 600×400 mm and a thickness of 0.25 mm which is mounted with a mask film on one face (TECHNOLOY manufactured by Sumitomo Chemical Co. Ltd.) was impregnated, after which the film was drawn up at a rate of 30 cm/minute to effect coating. The solvent was volatilized, and then the mask film was removed, followed by irradiation of a 120 W metal halide lamp (UB0451 manufactured by IGRAPHYICS) from a distance of 20 cm for 10 seconds. This results in the formation of a glare shielding layer on one face of the acrylic film. The face on which no glare shielding layer was formed was mounted with a mask film again.

Thus obtained acrylic film with a glare shielding layer was subjected to corona treatment on the surface of the glare shielding layer by an energy of 400 W·minute/$m^2$ by means of a corona treatment apparatus (3005DW-SLR: manufactured by SOFTAL NIHON Co.). Then, stain proofing layer of fluorine-containing silane compound was given to the corona-treated acrylic film with a glare shielding layer, on the glare shielding layer, in the same manner as in example 3.

[Formation of a Front Panel]

This acrylic film, from which the mask film was removed, was joined together on both sides of the transparent substrate obtained in the same manner as in example 1 by the use of acrylic adhesive. This results in a front panel having a glare shielding layer to which a stain proofing layer is given.

Compared with the front panel of example 1, there is less reflection of a background, exhibiting good visibility. Table 4 shows the results of remote-control tests.

Example 7

The glare shielding acrylic film with a stain proofing layer given obtained according to example 1 was joined together to one side of the transparent substrate obtained in the same manner as in example 5 by the use of acrylic adhesive. Whereas the acrylic film having a reflection preventing layer with a stain proofing layer given was joined together to another side by the use of acrylic pressure sensitive adhesive. This results in a front panel having a glare shielding layer subjected to stain proofing treatment on one side, and having a hard coat layer, reflection preventing layer, and stain proofing layer on another side. Thus obtained front panel was attached to a plasma display with the reflection preventing layer outside.

Compared with the front panel of example 1, there is less reflection of a background, exhibiting good visibility. Table 4 shows the results of remote-control tests.

Example 8

On the transparent substrate obtained in the same manner as in example 1, a hard coat layer, reflection preventing layer, and stain proofing layer were formed directly in the same manner as described in example 5, resulting in a front panel.

Compared with the front panel of example 1, there is less reflection of a background, exhibiting good visibility. Table 4 shows the results of remote-control tests.

Example 9

On the transparent substrate obtained in the same manner as in example 1, a conductive film made of polyethylene terephthalate (IDIXO/PET, Idemitsu Kosan Co., Ltd., surface resistivity: 10.9 Ω/□) was laminated to produce a front panel.

Tables 1 and 5 show the light transmittance and the electromagnetic shielding performance of the obtained front panel, respectively.

Example 10

By the use of commercially available hard coat PET (manufactured by Toyobo Co., Ltd.) as a transparent plastic film, a conductive thin film having a layered structure of cerium dioxide/silver/cerium dioxide was formed on the film surface by a vacuum evaporation method. The thickness of each layer measured by a quartz resonator method was cerium dioxide (403 Å)/silver(150 Å)/cerium dioxide(407 Å) from the transparent substrate side. The evaporation was conducted by means of electron beam heating for cerium dioxide, and resistance heating for silver.

The surface resistivity of the obtained conductive film was 6.0 Ω/□.

This conductive film was laminated on the transparent substrate obtained in the same manner as in example 1 to produce a front panel.

Tables 1 and 5 show the light transmittance and the electromagnetic shielding performance of the obtained front panel, respectively.

Example 11

Onto the both sides of the transparent substrate having near-infrared rays absorbing ability obtained in the same manner as in example 2, an acrylic film with a reflection preventing layer to which a stain proofing layer was given obtained in the same manner as in example 5 was joined together by acrylic adhesive, resulting in a transparent substrate having a hard coat layer, reflection preventing layer, and stain proofing layer.

This transparent substrate was used as a front panel of a plasma display. Compared with the front panel of example 2, there is less reflection of a background, exhibiting good visibility.

Table 4 shows the results of remote-control tests.

Example 12

Onto the both sides of the transparent substrate having infrared absorbing ability obtained in the same manner as in example 2, a glare shielding acrylic film with a contamination preventing layer given obtained in the same manner as in example 6 was joined together by acrylic adhesive, resulting in a transparent substrate having a glare shielding layer with a stain proofing layer given.

This transparent substrate was used as a front panel for a plasma display. Compared with the front panel of example 2, there is less reflection of a background, exhibiting good visibility.

Table 4 shows the results of remote-control tests.

Example 13

The same glare shielding acrylic film with the contamination preventing layer given as that in example 5 was joined together to one side of the transparent substrate obtained in the same manner as in example 2 by the use of acrylic adhesive in the same manner as in example 8. Whereas the same acrylic film having a reflection preventing layer with a stain proofing layer given as that in example 6 was joined together to another side by the use of acrylic adhesive. This results in a transparent substrate having a glare shielding layer subjected to stain proofing treatment on one side, and having a hard coat layer, reflection preventing layer, and stain proofing layer on another side.

This transparent substrate was attached to a plasma display with the reflection preventing layer outside.

Compared with the front panel of example 2, there is less reflection of a background, exhibiting good visibility. Table 4 shows the results of remote-control tests.

Example 14

In the same manner as in example 8, on the same transparent substrate having near-infrared absorbing rays ability as in example 2, a hard coat layer, reflection preventing layer, and stain proofing layer were formed directly to obtain a transparent substrate.

This transparent substrate was used as a front panel of a plasma display. Compared with the front panel of example 2, there is less reflection of a background, exhibiting good visibility.

Table 4 shows the results of remote-control tests.

Example 15

The film obtained in the same manner as in example 10 was joined together to the transparent substrate having near-infrared rays absorbing ability obtained in the same manner as in example 2 by acrylic adhesive to obtain a transparent substrate.

This transparent substrate was used as a front panel of a plasma display.

Tables 1 and 5 show the light transmittance and the electromagnetic shielding performance of the obtained front panel, respectively.

Example 16

A transparent substrate having near-infrared rays absorbing ability was obtained in the same manner as in example 2, except that 5 parts by weight of copper benzoate anhydride in place of 1.75 parts copper hydroxide. The same conductive film as used in example 10 was laminated on this transparent substrate to obtain a transparent substrate.

This transparent substrate was used as front panel of a plasma display.

Tables 1, 2 and 5 show the light transmittance, the difference of haze and the electromagnetic shielding performance of the obtained front panel, respectively.

Example 17

Onto the both sides of the transparent substrate having near-infrared rays absorbing ability obtained in the same manner as in example 3, an acrylic film with a reflection preventing layer to which a stain proofing layer was given obtained in the same manner as in example 5 was joined together by acrylic adhesive, resulting in a transparent substrate having a hard coat layer, reflection preventing layer, and stain proofing layer.

This transparent substrate was used as a front panel of a plasma display. Compared with the front panel of example 3, there is less reflection of a background, exhibiting good visibility. Table 4 shows the results of remote-control tests.

Example 18

Onto the both sides of the transparent substrate having near-infrared rays absorbing ability obtained in the same manner as in example 3, a glare shielding acrylic film with a stain proofing layer given obtained in the same manner as in example 6 was joined together by the use of acrylic adhesive, resulting in a transparent substrate having a glare shielding layer with a stain proofing layer given.

This transparent substrate was used as a front panel of a plasma display.

Compared with the front panel of example 3, there is less reflection of a background, exhibiting good visibility.

Table 4 shows the results of remote-control tests.

Example 19

The same glare shielding acrylic film with the stain proofing layer given as that in example 5 was joined together to one side of the transparent substrate having near-infrared rays absorbing ability obtained in the same manner as in example 3 by the use of acrylic adhesive. Whereas the same acrylic film having a reflection preventing layer with a stain proofing layer given as that in example 6 was joined together to another side by the use of acrylic adhesive. This results in a transparent substrate having a glare shielding layer subjected to stain proofing treatment on one side, and having a hard coat layer, reflection preventing layer, and stain proofing layer on another side.

This transparent substrate was attached to a plasma display with the reflection preventing layer outside.

Compared with the front panel of example 3, there is less reflection of a background, exhibiting good visibility.

Example 20

In the same manner as in example 8, on the same transparent substrate having near-infrared ray absorbing ability as in example 3, a hard coat layer, reflection preventing layer, and stain proofing layer were formed directly to obtain a transparent substrate.

This transparent substrate was used as a front panel for a plasma display.

Compared with the front panel of example 3, there is less reflection of a background, exhibiting good visibility.

Example 21

The conductive film obtained in the same manner as in example 10 was joined together to the transparent substrate having near-infrared rays absorbing ability obtained in the same manner as in example 3 by acrylic adhesive to obtain a transparent substrate.

This transparent substrate was used as a front panel for a plasma display.

Tables 1 and 5 show the light transmittance and the electromagnetic shielding performance of the obtained front panel, respectively.

Example 22

A transparent substrate was obtained in the same manner as in example 21, except that a transparent substrate having near-infrared rays absorbing ability obtained in the same manner as in example 4 was used.

This transparent substrate was used as a front panel for a plasma display.

Tables 1 and 5 show the light transmittance and the electromagnetic shielding performance of the obtained front panel, respectively.

Example 23

Five parts by weight of copper benzoate anhydride as a copper atom-containing compound, and 0.3 parts by weight of t-butyl peroxy-2-ethyl hexanoate as a radical polymerization initiator were added to 100 parts by weight of mixture consisting of 88% by weight of methylmethacrylate, and 6 parts by weight of phosphorus atom-containing compound represented by the above mentioned formula (7), and 6 parts by weight of phosphorus atom-containing compound represented by the above mentioned formula (8).

This transparent substrate was used as a front panel for a plasma display as it was. The visibility was good.

Tables 1 to 4 show the other evaluation results.

Comparative Example 1

A commercially available acrylic plate with a thickness of 3 mm (manufactured by Sumitomo Chemical Co., Ltd., SUMIPEX 000) was used as a front panel as it was.

There was reflection of a background, however, the visibility was good. Tables 1, 3 and 4 show the other evaluation results.

Comparative Example 2

A commercially available display filter comprising a acrylic plate having a reflection preventing layer (manufactured by Sumitomo Chemical Co., Ltd., ESCREEN FD) was used as a front panel.

There was no reflection of a background, and the visibility was good. Tables 1, 3 and 4 show the other evaluation results.

Comparative Example 3

The same conductive film as used in example 9 was laminated on a commercially available acrylic plate with a thickness of 3 mm (manufactured by Sumitomo Chemical Co., Ltd., SUMIPEX 000) to produce a front panel.

Tables 1 and 5 show the light transmittance and the electromagnetic shielding performance of the front panel, respectively.

Comparative Example 4

The same conductive film as used in example 10 was laminated on a commercially available acrylic plate with a thickness of 3 mm (manufactured by Sumitomo Chemical Co., Ltd., SUMIPEX 000) to produce a front panel.

Tables 1 and 5 show the light transmittance and the electromagnetic shielding performance of the front panel, respectively.

TABLE 1

| Wave length (nm) | Light Transmittance of Front Panel (%) Example | | | | | | | | | |
|---|---|---|---|---|---|---|---|---|---|---|
| | 1 | 2 | 3 | 4 | 9 | 10 | 15 | 16 | 21 | 22 | 23 |
| 400 | 60 | 82 | 79 | 78 | 27 | 28 | 41 | 44 | 38 | 44 | 80 |
| 450 | 78 | 86 | 86 | 82 | 56 | 48 | 54 | 56 | 52 | 56 | 86 |
| 500 | 88 | 89 | 89 | 88 | 71 | 59 | 60 | 63 | 58 | 61 | 88 |
| 550 | 79 | 89 | 89 | 88 | 57 | 52 | 59 | 63 | 56 | 60 | 88 |
| 600 | 70 | 78 | 80 | 76 | 31 | 23 | 49 | 51 | 44 | 47 | 80 |
| 650 | 48 | 50 | 50 | 48 | 8 | 5 | 25 | 30 | 24 | 26 | 50 |
| 700 | 15 | 14 | 18 | 20 | 2 | 1 | 8 | 11 | 9 | 9 | 20 |
| 750 | 10 | 4 | 10 | 7 | 1 | 0 | 3 | 4 | 4 | 3 | 9 |
| 800 | 8 | 3 | 6 | 5 | 1 | 0 | 1 | 2 | 2 | 2 | 6 |
| 850 | 5 | 3 | 6 | 5 | 1 | 1 | 2 | 2 | 2 | 1 | 6 |
| 900 | 5 | 5 | 9 | 6 | 2 | 1 | 2 | 3 | 3 | 2 | 7 |
| 950 | 6 | 6 | 12 | 8 | 4 | 1 | 2 | 3 | 3 | 3 | 9 |
| 1000 | 8 | 9 | 14 | 12 | 6 | 2 | 3 | 4 | 5 | 4 | 12 |

TABLE 1-continued

| Wave length (nm) | Light Transmittance of Front Panel (%) Comparative example | | | |
|---|---|---|---|---|
| | 1 | 2 | 3 | 4 |
| 400 | 88 | 58 | 88 | 58 |
| 450 | 92 | 60 | 92 | 60 |
| 500 | 92 | 60 | 92 | 60 |
| 550 | 92 | 60 | 92 | 60 |
| 600 | 92 | 60 | 92 | 60 |
| 650 | 92 | 60 | 92 | 60 |
| 700 | 92 | 85 | 92 | 85 |
| 750 | 92 | 90 | 92 | 90 |
| 800 | 92 | 90 | 92 | 90 |
| 850 | 92 | 88 | 92 | 88 |
| 900 | 92 | 85 | 92 | 85 |
| 950 | 92 | 82 | 92 | 82 |
| 1000 | 92 | 82 | 92 | 82 |

TABLE 2

| | Difference of haze before/after moisture test |
|---|---|
| Example 1 | 0.5 |
| Example 2 | 0.2 |
| Example 3 | 0.1 |
| Example 4 | 0.1 |
| Example 16 | 0.5 |
| Example 23 | 1.0 |

TABLE 3

| | Flexural Strength (Mpa) |
|---|---|
| Example 1 | 125 |
| Example 2 | 115 |
| Example 3 | 125 |
| Example 4 | 100 |
| Example 23 | 100 |
| Comparative example 1 | 120 |
| Comparative example 2 | 118 |

TABLE 4

| | Remote-control test (m) |
|---|---|
| Example 1 | 1.0 |
| Example 2 | 1.0 |
| Example 3 | 1.0 |
| Example 4 | 1.0 |
| Example 5 | 1.0 |
| Example 6 | 1.0 |
| Example 7 | 1.0 |
| Example 8 | 1.0 |
| Example 11 | 1.0 |
| Example 12 | 1.2 |
| Example 13 | 0.8 |
| Example 14 | 1.0 |
| Example 17 | 1.0 |
| Example 18 | 1.2 |
| Example 23 | 1.0 |
| Comparative example 1 | 10 |
| Comparative example 2 | 8 |

TABLE 5

| Frequency (MHz) | Electromagnetic shielding performance (dB) | | | | | | | |
|---|---|---|---|---|---|---|---|---|
| | Example | | | | | | Comparative example | |
| | 9 | 10 | 15 | 16 | 21 | 22 | 3 | 4 |
| 100 | 37 | 40 | 37 | 40 | 41 | 39 | 37 | 37 |
| 200 | 29 | 30 | 30 | 32 | 32 | 32 | 29 | 30 |
| 300 | 25 | 24 | 26 | 27 | 27 | 27 | 25 | 25 |
| 400 | 21 | 20 | 22 | 23 | 23 | 22 | 21 | 22 |
| 500 | 17 | 15 | 17 | 18 | 18 | 18 | 18 | 27 |
| 600 | 14 | 11 | 14 | 15 | 15 | 14 | 14 | 23 |
| 700 | 14 | 9 | 13 | 15 | 15 | 14 | 15 | 23 |
| 800 | 11 | 6 | 11 | 12 | 12 | 11 | 11 | 9 |
| 900 | 6 | 3 | 6 | 6 | 7 | 6 | 7 | 4 |
| 1000 | 3 | 2 | 3 | 3 | 4 | 3 | 3 | 2 |

What is claimed is:

1. A plasma display front panel comprising a transparent substrate, said transparent substrate being obtained by molding a resinous composition comprising the following components (a) to (c), and having a 50% or more average transmittance of light with a wavelength in the range of 450 nm to 650 nm and a 30% or less average transmittance of light with a wavelength in the range of 800 nm to 1000 nm:

(a) a monomer having an unsaturated double bond and/or polymer thereof;

(b) a phosphorus atom-containing compound represented by the following general formula:

$$[CH_2=C(X)COO(Y)_m—]_{3-n}—P(O)—(OH)_n$$

wherein x denotes a hydrogen atom or methyl group, when said Y is an oxyalkylene group with 2 carbon atoms, m is a number average of 8 to 20, when said Y is an oxyalkylene group with 3 carbon atoms, m is a number average of 5 to 20, and when said Y is an oxyalkylene group with 4 carbon atoms, m is a number average of 4 to 20, and n represents 1 or 2; and (c) a copper atom-containing compound.

2. A plasma display front panel according to claim 1, wherein said monomer having an unsaturated double bond is a monofunctional or multifunctional monomer having at least one radical polymerizable unsaturated double bond per molecule.

3. A plasma display front panel according to claim 1, wherein said monomer having an unsaturated double bond is methyl methacrylate, or a monomer mixture containing at least 50% by weight of methyl methacrylate.

4. A plasma display front panel according to claim 1, wherein said monomer having an unsaturated double bond contains a (meth)acrylate monomer represented by the following general formula (1);

$$CH_2=(X)COOR^1 \quad (1)$$

wherein X denotes a hydrogen atom or methyl group, and $R^1$ denotes a hydrocarbon radical with 3 to 18 carbon atoms, and a multifunctional monomer having at least 2 unsaturated double bonds per molecule, and the total amount thereof is 50% by weight or more.

5. A plasma display front panel according to claim 4, wherein said $R^1$ is an alicyclic hydrocarbon radical with 3 to 18 carbon atoms.

6. A plasma display front panel according to claim 4, wherein said (meth)acrylate is cyclohexyl (meth)acrylate, isobornyl (meth)acrylate, tricyclo[5. 2. 1. $0^{2,6}$]deca-8-yl (meth)acrylate, or dicyclopentenyl (meth)acrylate.

7. A plasma display front panel according to claim 4, wherein said multifunctional monomer is polyethylene glycol di(meth)acrylate.

8. A plasma display front panel according to claim 4, wherein 0.1 to 10 parts by weight of said multifunctional monomer is contained per 1 part by weight of said (meth)acrylate.

9. A plasma display front panel according to claim 1, wherein said copper atom-containing compound is a salt of carboxylic acid and copper ion, a complex salt of a cetylacetone or acetoacetic acid and copper ion, or copper hydroxide.

10. A plasma display front panel according to claim 1, wherein said copper atom-containing compound is copper hydroxide.

11. A plasma display front panel according to claim 1, wherein said resinous composition contains 0.1 to 50 parts by weight of phosphorus atom-containing compound (b) and 0.01 to 30 parts by weight of copper atom-containing compound (c) per 100 parts by weight of monomer having an unsaturated double bond and/or polymer thereof.

12. A plasma display front panel according to claim 1, wherein said transparent substrate is the one obtained by forming a layer made of a resinous composition with near-infrared rays absorbing ability on a transparent plastic film, plastic sheet or plate glass with no near-infrared rays absorbing ability.

13. A plasma display front panel produced by laminating an electromagnetic shielding layer on said transparent substrate according to claim 1.

14. A plasma display front panel according to claim 13, wherein said electromagnetic shielding layer is a transparent plastic film, plastic sheet or plate glass having conductivity.

15. A plasma display front panel according to claim 14, wherein said transparent sheet having conductivity is a plastic film, plastic sheet or plate glass having a conductive thin film on the surface.

16. A plasma display front panel according to claim 15, wherein said conductive thin film comprises a laminate of alternate layers of metal layer and dielectric layer.

17. A plasma display front panel according to claims 1, or 13, further comprising a hard coat layer on the surface.

18. A plasma display front panel according to claims 1, or 13, further comprising a reflection preventing layer on the surface.

19. A plasma display front panel according to claims 1, or 13, further comprising a stain proofing layer on the surface.

* * * * *